United States Patent [19]

Nishikawa et al.

[11] Patent Number: 5,511,210
[45] Date of Patent: Apr. 23, 1996

[54] VECTOR PROCESSING DEVICE USING ADDRESS DATA AND MASK INFORMATION TO GENERATE SIGNAL THAT INDICATES WHICH ADDRESSES ARE TO BE ACCESSED FROM THE MAIN MEMORY

[75] Inventors: Takeshi Nishikawa, Tokyo; Yoko Isobe, Yamanashi, both of Japan

[73] Assignee: NEC Corporation, Tokyo, Japan

[21] Appl. No.: 77,739

[22] Filed: Jun. 18, 1993

[30] Foreign Application Priority Data

Jun. 18, 1992 [JP] Japan ..................... 4-158412

[51] Int. Cl.[6] ................ G06F 12/00; G06F 15/347
[52] U.S. Cl. ............... 395/800; 364/232.21; 364/252.5; 364/259.7; 364/DIG. 1; 364/931.51; 364/958.2; 395/375
[58] Field of Search .................... 395/800, 375, 395/725, 775, 425; 364/DIG. 1, DIG. 2

[56] References Cited

U.S. PATENT DOCUMENTS

| | | | |
|---|---|---|---|
| 4,490,786 | 12/1984 | Nakatani | 395/800 |
| 4,621,324 | 11/1986 | Ushiro et al. | 395/800 |
| 4,680,730 | 7/1987 | Omoda et al. | 395/425 |
| 4,740,893 | 4/1988 | Buchholz et al. | 395/800 |
| 4,791,555 | 12/1988 | Garcia et al. | 395/800 |
| 4,841,438 | 6/1989 | Yoshida et al. | 395/800 |
| 4,852,049 | 7/1989 | Sakai | 395/375 |
| 4,881,168 | 11/1989 | Inagami et al. | 395/800 |
| 5,010,483 | 4/1991 | Mishina et al. | 395/800 |
| 5,247,695 | 9/1993 | Kashiyama et al. | 395/800 |

OTHER PUBLICATIONS

C. H. Ngai et al; "High Speed Look–Ahead Vector Mask Register Control"; IBM. Technical Disclosure Bulletin, vol. 27, No. 9, Feb. 1985. pp. 5414–5415.

Primary Examiner—Meng-Al An
Attorney, Agent, or Firm—Foley & Lardner

[57] ABSTRACT

A vector processing device of the present invention comprises a vector processor provided with more than one vector register, operation means for vector operations and a vector control register to store the mask information indicating the effectiveness of the vector data, a storage to store the vector data and a storage controller to control access to the storage. The storage controller has an access control means to select address data for access to the storage stored in the vector register from the address information registration means according to the mask information and a load data storage means to temporarily hold the data obtained by access to the storage using the selected address data and a load data expansion means which uses the held data to expand the load data according to the mask information stored in the mask registration means and stores such data to the vector register.

5 Claims, 10 Drawing Sheets

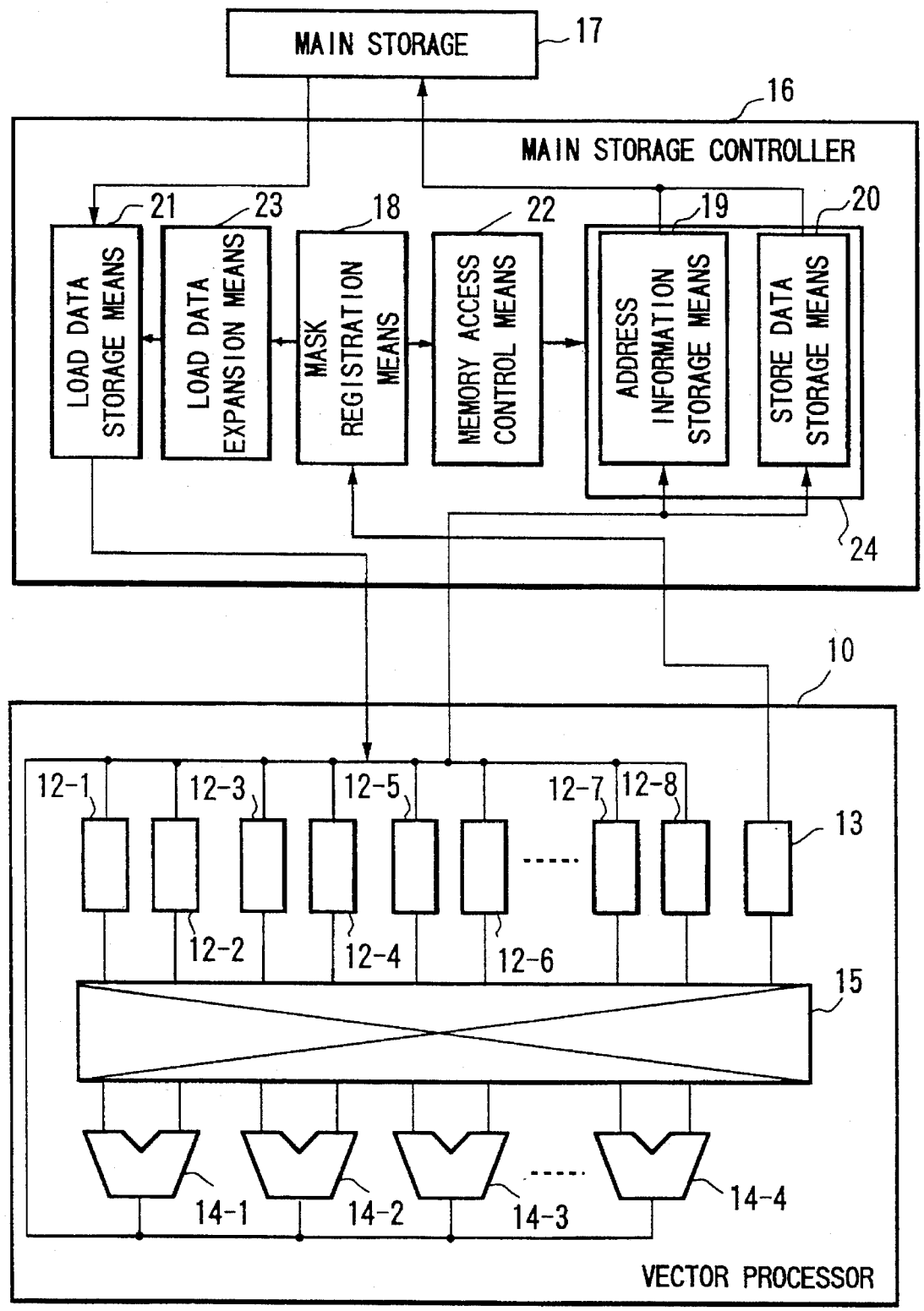

FIG.3

| | | | | | | | | | | |
|---|---|---|---|---|---|---|---|---|---|---|
| 12-1 | a1 | a2 | a3 | a4 | a5 | a6 | a7 | a8 | a9 | a10 |

VECTOR REGISTER

| | | | | | | | | | | |
|---|---|---|---|---|---|---|---|---|---|---|
| 12-2 | x1 | x2 | x3 | x4 | x5 | x6 | x7 | x8 | x9 | x10 |

VECTOR REGISTER

| | | | | | | | | | | |
|---|---|---|---|---|---|---|---|---|---|---|
| 13 | 1 | 1 | 0 | 1 | 0 | 1 | 1 | 0 | 0 | 1 |

VECTOR CONTROL REGISTER

| | | | | | | | | | | |
|---|---|---|---|---|---|---|---|---|---|---|
| 22 | a1 | a2 | a4 | a6 | a7 | a10 | | | | |

DATA SELECTED BY MEMORY ACCESS CONTROL MEANS

| | | | | | | | | | | |
|---|---|---|---|---|---|---|---|---|---|---|
| 21 | b1 | b2 | b4 | b6 | b7 | b10 | * | * | * | * |

LOAD DATA STORAGE MEANS

| | | | | | | | | | | |
|---|---|---|---|---|---|---|---|---|---|---|
| 23 | b1 | b2 | * | b4 | * | b6 | b7 | * | * | b10 |

LOAD DATA EXPANSION MEANS

| | | | | | | | | | | |
|---|---|---|---|---|---|---|---|---|---|---|
| 12-2 | b1 | b2 | x3 | b4 | x5 | b6 | b7 | x8 | x9 | b10 |

VECTOR REGISTER

*: ARBITRARY VALUE

FIG.4

| | | | | | | | | | | |
|---|---|---|---|---|---|---|---|---|---|---|
| 12-1 | a1 | a2 | a3 | a4 | a5 | a6 | a7 | a8 | a9 | a10 |

VECTOR REGISTER

| | | | | | | | | | | |
|---|---|---|---|---|---|---|---|---|---|---|
| 12-2 | b1 | b2 | b3 | b4 | b5 | b6 | b7 | b8 | b9 | b10 |

VECTOR REGISTER

| | | | | | | | | | | |
|---|---|---|---|---|---|---|---|---|---|---|
| 13 | 1 | 1 | 0 | 1 | 0 | 1 | 1 | 0 | 0 | 1 |

VECTOR CONTROL REGISTER

| | | | | | | | | | | |
|---|---|---|---|---|---|---|---|---|---|---|
| 22 | a1 | a2 | a4 | a6 | a7 | a10 | | | | |

ADDRESS DATA SELECTED BY MEMORY ACCESS CONTROL MEANS

| | | | | | | | | | | |
|---|---|---|---|---|---|---|---|---|---|---|
| 22 | b1 | b2 | b4 | b6 | b7 | b10 | | | | |

STORE DATA SELECTED BY MEMORY ACCESS CONTROL MEANS

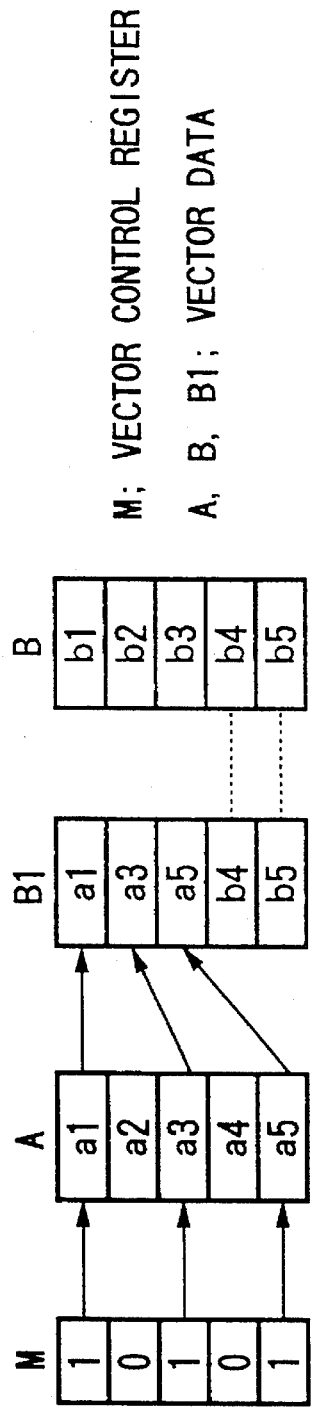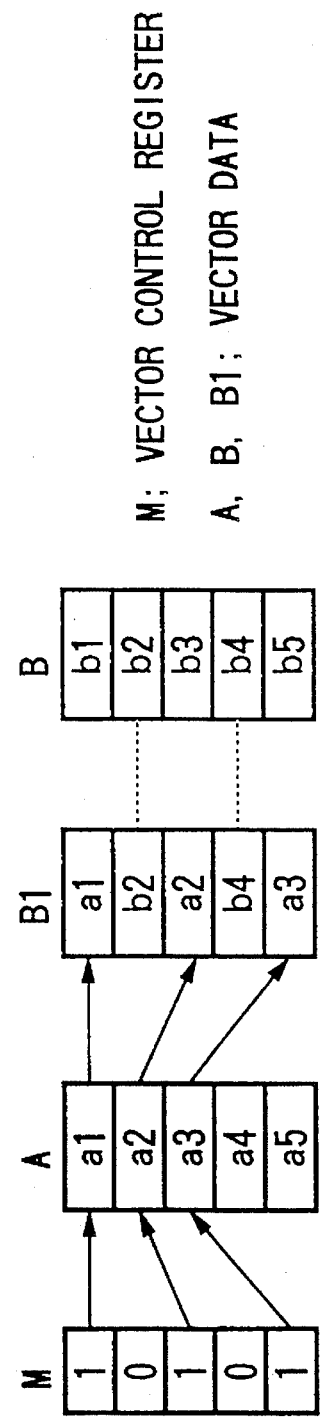

FIG.10
(PRIOR ART)
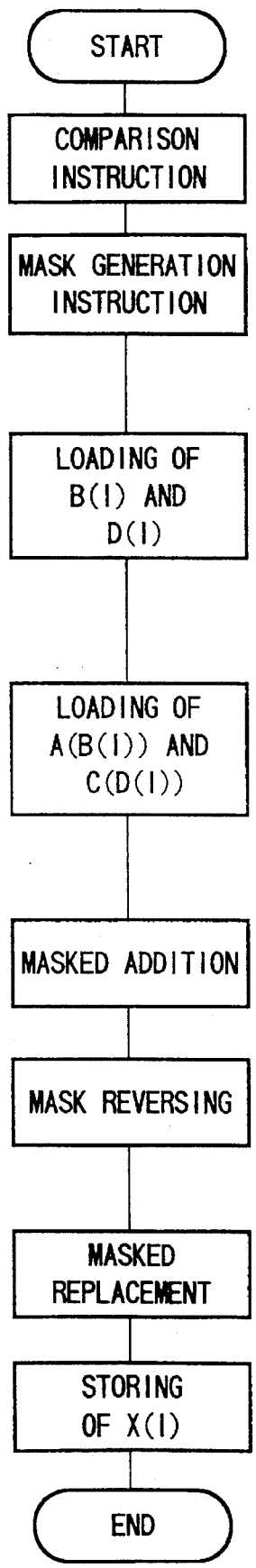
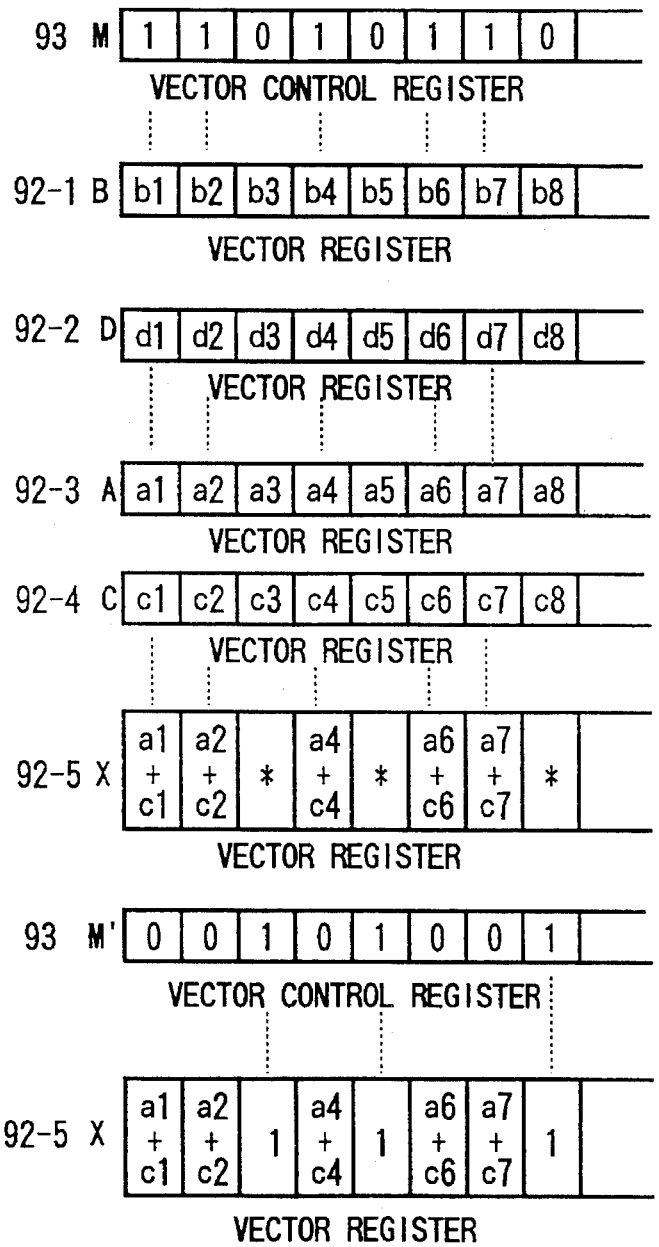
*: DATA STORED AT VECTOR REGISTERS 92-5 FROM THE FIRST

FIG.11
(PRIOR ART)
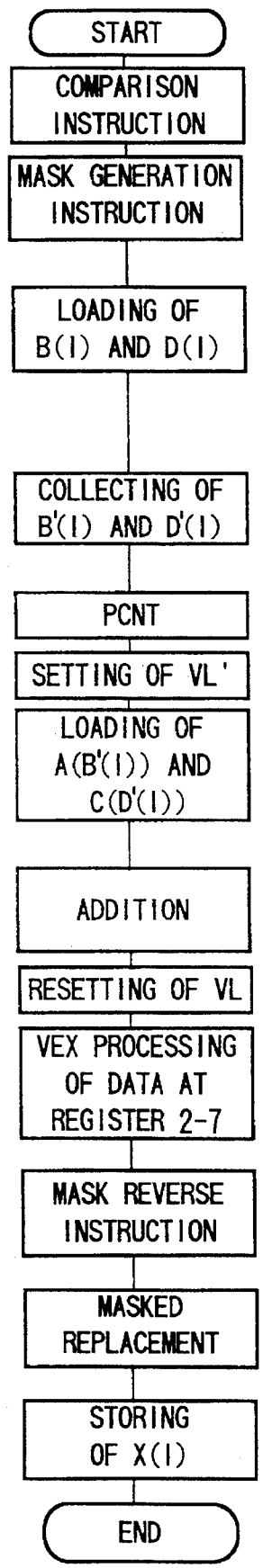
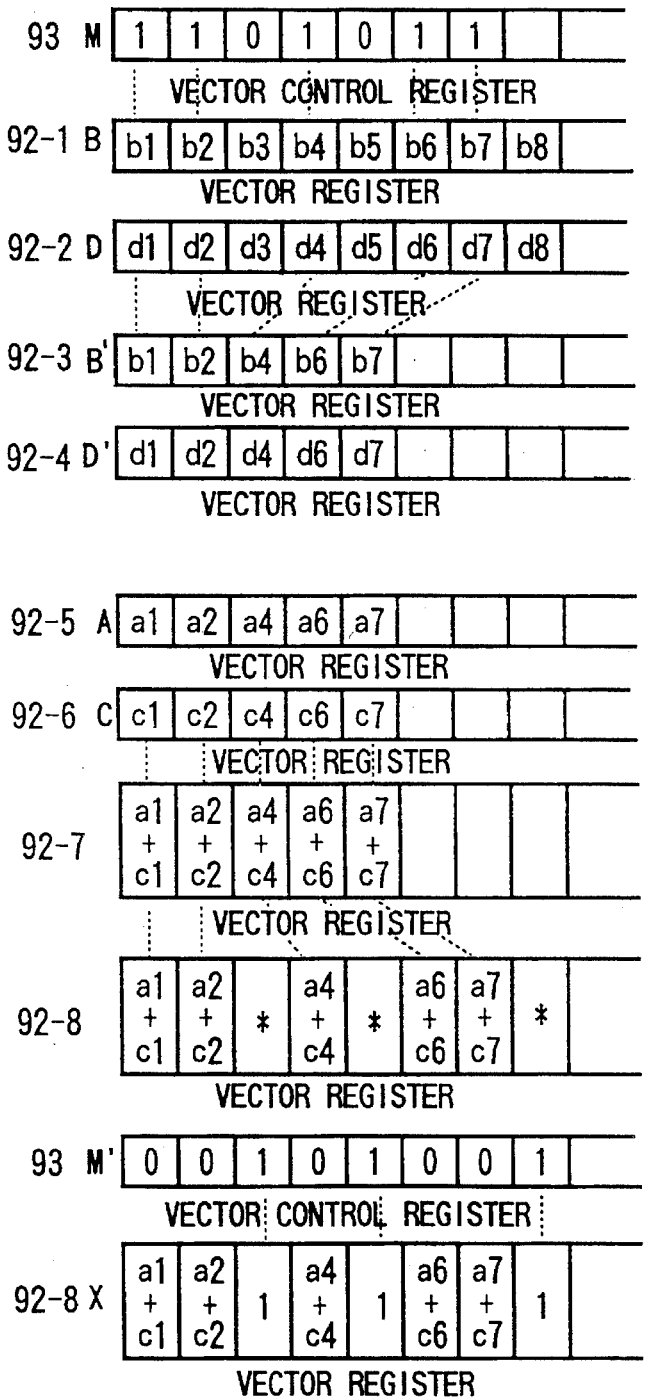
*: DATA STORED AT VECTOR REGISTERS 92-8 FROM THE FIRST

VECTOR PROCESSING DEVICE USING ADDRESS DATA AND MASK INFORMATION TO GENERATE SIGNAL THAT INDICATES WHICH ADDRESSES ARE TO BE ACCESSED FROM THE MAIN MEMORY

BACKGROUND OF THE INVENTION

1. Field of the Invention

The present invention relates to a vector processing device.

2. Description of the Prior Art

A conventional vector processing device processes list vector instructions in IF statements using masked vector operations and vector compress and vector expand instructions, because it is not provided with any means for masked list vector processing.

FIG. 7 illustrates the vector compress instruction. The vector data A (a1, a2, a3, a4 and a5) are checked against the mask bits M (1, 0, 1, 0, 1) indicated at the vector control register. From the data A, the elements at the positions where the mask bit is "1" are picked up. Such picked up elements replaces the elements in the vector data B (b1, b2, b3, b4, b5) from the first end. For the remaining positions of the vector register, the original elements of the vector data B1 are left. Thus, the data B' (a1, a3, a5, b4, b5) are generated. Such vector compress instruction is hereinafter referred to as a VCP instruction.

FIG. 8 illustrate the vector expand instruction. The elements in the vector data B (b1, b2, b3, b4, b5) are replaced or left depending on the mask bit M (1, 0, 1, 0, 1) at the vector control register. For the positions where the mask bit is "1", the applicable element in the vector data A (a1, a2, a3, a4, a5) replaces the element in the data B; when it is "0", the corresponding element in the data B is left as it is. Thus, the data B1 (a1, b2, a2, b4 and a3) is generated. Such vector expand instruction is hereinafter referred to as a VEX instruction.

FIG. 9 shows a configuration example of such a conventional vector processing device. In the figure, vector registers 92-1 to 92-8 and a vector control register 93 are connected to operation devices 94-1 to 94-4 via a crossbar 95. The results obtained at the operation devices 94-1 to 94-4 can be stored in any of the vector registers 92-1 to 92-8. In masked operation, the mask data stored at the vector control register 93 controls whether or not to store an operation result to a vector register. More specifically, the operation result is not stored to the element for which the mask data in the vector control register 93 is "0" and is stored to the element for which the mask data is "1". The vector registers 92-1 to 92-8 send data to and receive data from a main storage 97 via a main storage controller 96.

Suppose a conditional expression (IF statement) as follows:

DO 10 I= 1, N
IF (M(I).EQ.O)
THEN
X(I)= A(B(I))+C(D(I))
ELSE
X(I)=1
10 CONTINUE

Such an expression may be generally processed by masked operations for all vector elements (hereinafter referred to as VL) or by utilizing VCP and VEX instructions while limiting the processed elements to those for which the condition is true.

Referring first to the flowchart of FIG. 10, the method to subject all vector elements (VL) to the masked operation will be described below with showing the register contents.

Firstly, a comparison instruction causes comparison of M(I) and O. For a mask generation instruction, the comparison condition can be specified in the operation code. This instruction stores "1" when the condition is true and "0" when it is not true to the vector control register 93. It is supposed here that the mask data are (1, 1, 0, 1, 0, 1, 1, 0, ...). Then, B(I) (b1, b2, b3, b4, ...) and D(I) (d1, d2, d3, d4 ....) are loaded from the main storage 97 to the vector registers 92-1 and 92-2.

The data in the vector registers 92-1 and 92-2 are read and sent to the main storage controller 96 and then the main storage 97 is accessed with using B(I) and D(I) as the address data. Via the main storage controller 96, the data A(B(I))(a1, a2, a3, a4 ... ) and C(D(I))(c1, c2, c3, c4 ... ) are loaded to the vector registers 92-3 and 92-4. Such processing where the main storage is accessed using the vector data as addresses for vector data loading is called the list vector loading.

The data in the vector registers 92-3 and 92-4 are read out and input to the operation device 94-1 for processing. Among the results, only those for the elements having "1" as the mask data are stored to the vector register 92-5.

Next, a mask reverse instruction is issued so as to reverse the bits in the vector control register 93 (M' (0, 0, 1, 0, 1, 0, 0, 1 . . . )). The elements in the vector register 92-5 corresponding to "1" in such mask data are replaced with "1". Then, the contents of the vector register 92-5 are stored to the main storage 97.

This method is advantageous because it eliminates the need of auxiliary operations using VCP and VEX instruction. However, it has a drawback that all vector elements must be processed even when the rate of "true" is low.

Next, referring to the flowchart of FIG. 11, the other method where only the elements for which the condition is true are processed by utilizing VCP and VEX instructions, while showing the register contents.

Firstly, a comparison instruction causes comparison of M(I) and O, and a mask generation instruction stores the mask data to the vector control register 93. The mask data are supposed here to be (1, 1, 0, 1, 0, 1, 1, 0, .... ). The data B(I) and D(I) are loaded from the main storage 97 to the vector registers 92-1 and 92-2. A VCP instruction compresses the data B(I) and D(I) in the vector registers 92-1 and 92-2 according to the contents in the vector control register 93 so as to generate the data B'(I) (b1, b2, b4, b6, b7 . . . ) and D'(I) (c1, c2, c4, c6, c7 . . . ), which are stored to the vector registers 92-3 and 92-4.

Here, the bits having "1" in the data at the vector control register 93 are counted (PCNT instruction), and the counted value is used as the vector processing element number (VL': VL'<VL). Thereafter, VL' is used for processing until VL is reset. Then, the data in the vector registers 92-3 and 92-4 are read out and sent to the main storage controller 96 and the main storage 97 is accessed with using B'(I) and D'(I) as addresses. Via the main storage controller 96, the data A(B'(I)(a1, a2, a4, a6, a7) and C(D'(I)(c1, c2, c4, c6, c7 . . . ) are loaded to the vector registers 92-5 and 92-6. The data in the vector registers 92-5 and 92-6 are read out and input to the operation device (adder) 94-1 for processing. The operation results are stored to the vector register 92-7. Then, the VL is reset to the original value and the data in the vector register 92-7 are expanded by a VEX instruction, and the results are stored to the vector register 92-8.

Next, a mask reverse instruction is issued so as to reverse the bits in the vector control register 93 (M' (0, 0, 1, 0, 1, 0, 0, 1 . . . )). The positions in the vector register 92-8 corresponding to "1" in such mask data are replaced with "1". Then, the contents in the vector register 92-8 are stored to the main storage 97.

This method requires shorter operation time when the rate of "true" is low because processed elements are limited to those for which the condition is "true" in the IF statement. It requires, however, auxiliary operations such as VCP, VEX and PCNT instructions, which take much time when the rate of "true" is high.

Suppose now a conditional expression as follows:
DO 10 I= 1, N
IF (M(I). EQ. O) GO TO 10
X (C(I))= A(I)+ B(I)
10 CONTINUE Conventionally, such an expression is processed by utilizing VCP and VEX instructions while limiting the processed elements to those for which the condition is true. Referring to the flowchart of FIG. 12, this method is described below while showing the register contents.

Firstly, a comparison instruction causes comparison of M(I) and O, and a mask generation instruction stores the mask data to the vector control register 93. The mask data are supposed here to be (1, 1, 0, 1, 0, 1, 1, 0, . . . . ). The data A(I), B(I) and C(I) are loaded from the main storage 97 to the vector registers 92-1, 92-2 and 92-3. The data in the vector registers 92-1 and 92-2 are read out and input to the operation device (adder) 94-1 for processing. The results are stored to the vector register 92-4, only for the positions for which the mask data is "1".

Then a VCP instruction compresses the addition results (store data) in the vector register 92-4 and and the address data C (I) in the vector register 92-3 according to the contents in the vector control register 93 and stores the results to the vector registers 92-5 and 92-6. Here, the bits having "1" in the data at the vector control register 93 are counted (PCNT instruction), and the counted value is used as the vector processing element number (VL'). Thereafter, VL' is used for processing until VL is reset. Then, the store data stored in the vector register 92-5 and the address data (C'(I)) stored in the vector register 92-6 are read out and sent to the main storage controller 96. The store data are stored to the vector storage 97 using the data C'(I) as the addresses. An advantage of this method is that the vector elements to be processed are limited to those for which the condition is true and no other elements are processed. However, the need of auxiliary operations such as VCP and PCNT instructions results in a lengthy operation.

As described above, a conventional vector processing device has drawbacks concerning processing of list vectors in conditional expressions. When it processes all vector elements by masked operation, it eliminates the need of auxiliary operations, but has to perform many unnecessary operations because all vector elements are processed even when the rate of "true" is low.

When the vector processing device adopts the other method where the true elements only are processed with using VCP and VEX instructions, the operation time becomes shorter when the rate of "true" is low because the true vector elements only are processed, but it requires auxiliary operations such as VCP and VEX instructions.

Besides, in order to take the maximum advantage of a vector processing device, it is necessary to adopt the most suitable method for the program. For this purpose, a conventional device requires a compiler which examines the rate of "true" and other information for the conditional expression in the program so as to select the suitable one from the two methods above.

SUMMARY OF THE INVENTION

An object of the present invention is to provide a vector processing device which eliminates the need of auxiliary operations such as VCP and VEX instructions and PCNT instructions and reduces the number of accesses to the main storage and thereby improves the speed of IF statement processing.

According to a preferred embodiment of the present invention to attain the above object, a vector processing device comprises a vector processor further containing more than one vector register, operation means for vector operation and a vector control register to store the mask information indicating the effectiveness of the vector data, a storage to store the vector data, and a storage controller to control access to the storage, wherein the storage controller further comprises a store direction means to generate a signal to direct whether or not to store the vector data to be stored from the vector processor to the storage according to the mask information and a means to store the data obtained by access to the storage to the vector register according to the mask information.

According to a still preferred embodiment of the present invention the storage controller comprises an address information registration means to store the address data for access to the storage stored in the vector register and a mask registration means to hold the contents of the vector control register. Further, the storage controller comprises a load data storage means to temporarily store the data obtained by access to the storage and a store data storage means to temporarily store the data to be stored to the storage.

According to a further preferred embodiment of the present invention, the store direction means generates a signal to direct storing of the vector data at the positions where the mask information is "1" to the storage and the data storage means stores the data for which the mask information is "1" to the vector register and does not store those for which the mask information is "0" to the vector register.

According to another preferred embodiment of the present invention to attain the above object, a vector processing device comprises a vector processor further provided with more than one vector register, operation means for vector operations and a vector control register to store the mask information indicating the effectiveness of the vector data, a storage to store the vector data, and a storage controller to control access to the storage wherein the storage controller further comprises an address data selection means to select the address data to access to the storage stored at the vector register according to the mask information and a data storage means to store the data obtained by accessing the storage using the selected address data to the vector register according to the mask information.

According to a still preferred embodiment, the address data selection means comprises an address information registration means to store the address data for access to the storage stored in the vector register, a mask registration means to keep the mask information for the vector control register and an access control means to select the address data from the address information registration means based on the mask information registered to the mask registration means wherein the data storage means further comprises a load data storage means to temporarily store the vector data obtained by access to the storage using the address data selected by the access control means and a load data expansion means which uses the data held at the load data storage means to expand the load data according to the mask information stored to the mask registration means so as to store them to the vector register. Further, the storage controller comprises an access information registration means further comprising an address information registration means to store the address data for access to the storage stored in the vector register and a store data storage means which keeps the vector data to be stored to the storage, and an access control means to obtain the store data to be stored to the storage according to the mask information and the storing address on the storage from the access information registration means.

According to a still preferred embodiment, the access control means accesses the storage at the addresses in the address information registration means for which the mask information is "1", and does not access the storage at the addresses of the address information registration means for which the mask information is "0". Further, the load data expansion means stores the load data for the elements of the vector register for which the mask information is "1" and stores an arbitrary value for the elements of the vector register for which the mask information is "0".

Other objects, characteristics and effects of the present invention will be clarified in the detailed description below.

BRIEF DESCRIPTION OF THE DRAWINGS

FIG. 2 is a block diagram to show the configuration of a vector processing device according to a second embodiment of the present invention;

FIG. 3 is an explanatory view of the masked list vector loading by a vector processing device according to the second embodiment;

FIG. 4 is an explanatory view of the masked list vector storing by a vector processing device according to the second embodiment;

FIG. 7 is an explanatory view to illustrate the operation caused by a vector compress instruction;

FIG. 8 is an explanatory view to illustrate the operation caused by a vector expand instruction;

FIG. 10 is a flowchart to illustrate a first conventional method of processing an IF statement including list vector loading;

FIG. 11 is a flowchart to illustrate a second conventional method of processing an IF statement including list vector loading.

DESCRIPTION OF THE PREFERRED EMBODIMENT

Referring to the attached figures, preferred embodiments of the present invention will be described in detail below.

Figure 1:
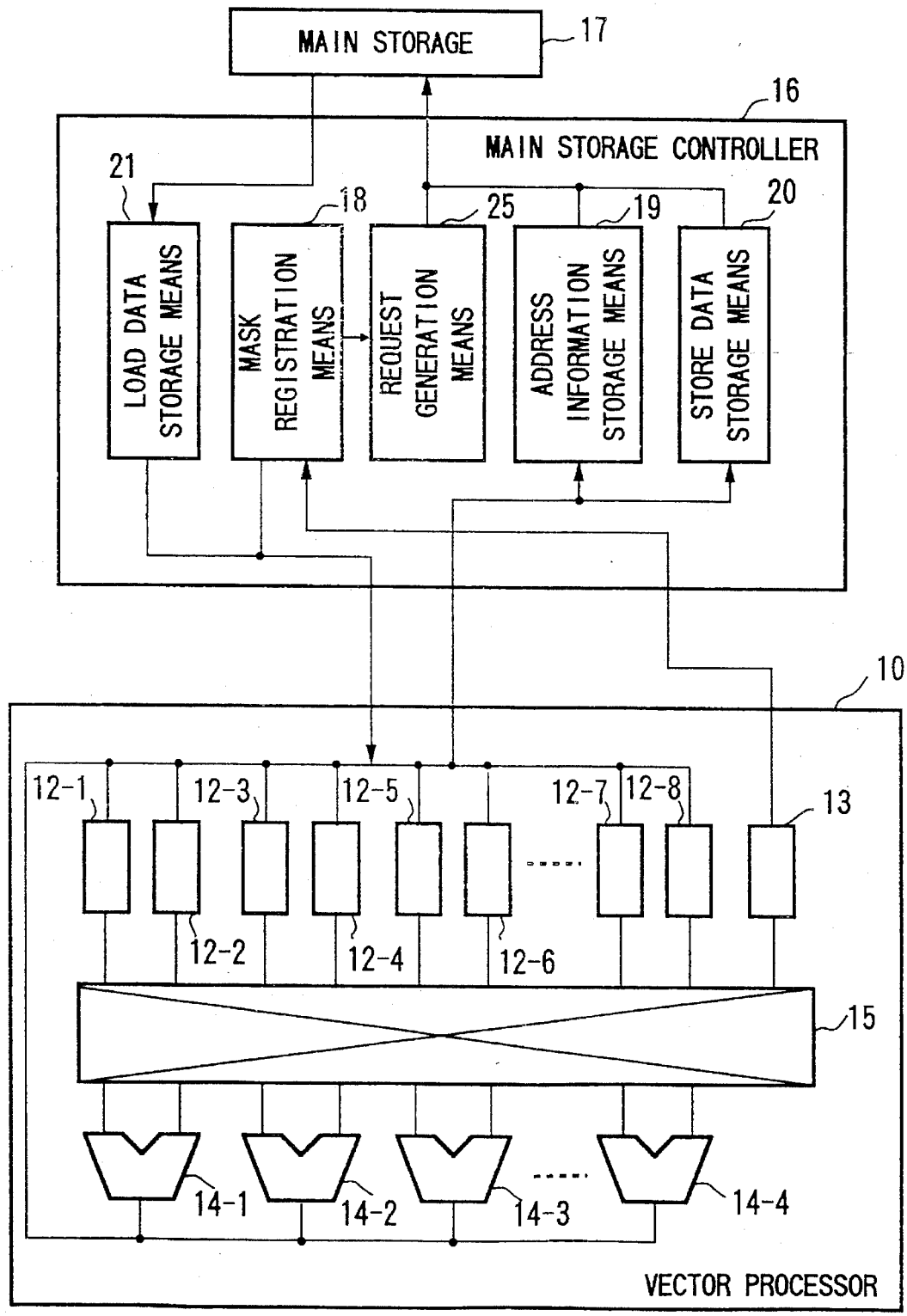
FIG. 1 is a block diagram to show the configuration of a vector processing device according to a first embodiment of the present invention.

FIG. 1 is a block diagram to show the configuration of a vector processing device according to a preferred embodiment of the present invention. A vector processor 10 comprises more than one vector register (vector registers 12-1 to 12-8), a vector control register 13, a plurality of operation devices (14-1 to 14-4) and a crossbar 15. The vector registers 12-1 to 12-8 and the vector control register 13 are connected to the operation devices 14-1 to 14-4 via the crossbar 15.

The results obtained by the operation devices 14-1 to 14-4 can be stored to any of the vector registers 12-1 to 12-8. Further, in masked operation, mask data stored in the vector control register 13 controls whether or not to store the elements of the operation results to the vector registers 12-1 to 12-8. The vector registers 12-1 to 12-8 send data to and receive data from the main storage 17 via the main storage controller 16 (to be described below).

The main storage controller 16 comprises a mask registration means 18, an address information registration means 19, a load data storage means 21, a store data storage means 20 and a request generation means 25. The address information registration means 19 keeps the addresses to access the main storage 17 sent from the vector registers 12-1 to 12-8 and the store data storage means 20 keeps the vector data to be stored to the main storage 17.

The load data storage means 21 temporarily keeps the vector data obtained by accessing the main storage 17. The mask registration means 18 keeps the mask data sent from the vector control register 13. Such mask data are sent to the vector processor 10 together with the load data stored in the load data storage means 21. The request generation means 25 converts the mask data stored in the mask registration means 18 into request signals. The main storage 17 stores the store data in the store data storage means 20, only for the elements for which the request signals are received.

For processing of a masked list vector load instruction, the main storage 17 is accessed at the addresses kept at the address information registration means 19. The data obtained by such accessing are temporarily stored in the load data storage means 21 and sent to the vector processor 10 together with the mask data in the mask registration means 18. For the elements of the vector register at the positions for which the mask data sent from the main storage controller 16 is "1", the load data sent from the main storage controller 16 are stored. For the vector register elements at the positions for which the mask data is "0", the load data sent from the main storage controller 16 are not stored and the data originally existing in the vector register are left.

For processing of a masked list vector store instruction, when the mask data stored in the mask registration means 18 is "1", the request generation means 25 converts such data into a request signal, which directs writing of data to the main storage 17. When the mask data is "0", it does not convert the data into a request signal. Together with the data after conversion to a request signal, address and store data are sent to the main storage 17. The main storage 17 stores the store data when it recognizes the request signal. In other words, the store data for the positions where the mask data in the mask registration means 18 is "1" are stored at the main storage 17, but those for the positions where the mask data is "0" are not stored to the main storage 17.

FIG. 2 shows the configuration of a vector processing device according to a second embodiment of the present invention. In the figure, a vector processor 10 has the same configuration as the first embodiment shown in FIG. 1.

A main storage controller 16 comprises a mask registration means 18, a memory access information registration means 24, a load data storage means 21, a memory access control means 22, a load data expansion means 23. The memory access information registration means 24 comprises an address information registration means 19 to store the addresses for accessing the main storage 17 and a store data storage means 20 to store the data to be stored at the main storage 17.

The mask registration means 18 keeps the mask data sent from the vector control register 13 in the vector processor 10 and the memory access control means 22 selects the information for accessing the main storage 17 from the memory access information registration mean 24 according to the mask data contents stored in the mask registration means 18.

For processing of a list vector load instruction, the memory access control means 22 controls the device so that it accesses the main storage 17 at the addresses, among those kept at the address information registration means 19, corresponding to the positions for which the mask data stored in the mask registration means 18 is "1" and does not access the main storage 17 at the addresses corresponding to the positions for which the mask data is "0".

The load data obtained by such access to the main storage 17 are temporarily kept at the load data storage means 21. The load data expansion means 23 expands the load data in the load data storage means 21 according to the same principle as the VEX instruction. Specifically, it expands the load data for the positions where the mask data is "1" and stores an arbitrary value for the positions where the mask data is "0".

The values in the above step need not to be assured. When the data generated by the load data expansion means 23 are sent to the vector processor 10 to be stored to an arbitrary vector register, the mask data at the mask registration means 18 are together sent to the vector processor 10. Thus, the data sent from the main storage 16 are stored for the vector register elements at the positions for which the mask data is "1". For the positions where the mask data is "0", the data originally stored in the vector register are left and the data sent from the main storage controller 16 are not stored.

Referring now to the data flow in FIG. 3, the operation for a masked list vector load instruction at the vector processing device according to the second embodiment is described.

Suppose here that the vector register 12-1 keeps the address data A (a1, a2, a3 . . . . a10) for access to the main storage 17; the vector register 12-2 keeps X (x1, x2, x3 . . . , x10); and the vector control register 13 keeps the mask data (1, 1, 0, 1, 0, 1, 1, 0, 0, 1).

When a masked list vector load instruction is issued, the vector processor 10 sends the address data and mask data to the main storage controller 16. The mask data (1, 1, 0, 1, 0, 1, 1, 0, 0, 1) are stored at the mask registration means 18 and the address data (a1, a2, a3, . . . . a10) are stored at the address information registration means 19. The memory access control means 22 sends the addresses for the positions where the mask data is "1" in the mask registration means 18, i.e. (a1, a2, a4, a6, a7, a10), to the main storage 17. The main storage 17, upon receipt of these addresses, sends the data corresponding to these addresses (a1, a2, a4, a6, a7, a10) to the load data storage means 21. Suppose the data here are B(b1, b2, b4, b6, b7, b10).

The load data expansion means 23 stores the data B(b1, b2, b4, b6, b7, b10) to the positions where the mask data in the mask registration means 18 is "1" (first, second, fourth, sixth, seventh and tenth elements) and stores an arbitrary value (*) at the positions where the mask data is "0" (third, fifth, eighth and ninth elements). Thus, the data B'(b1, b2, *, b4, *, b6, b7, *, *, b10) are generated. Then the data B' are sent to the vector processor 10 so as to be stored in the vector register 12-2.

When the data is stored at the vector register 12-2, the data B' elements are stored for the positions for which the mask data in the vector control register 13 is "1" (first, second, fourth, sixth, seventh and tenth elements). For the positions where the mask data is "0" (third, fifth, eighth and ninth elements), the data X elements (x3, x5, x8, x9) originally stored in the vector register 12-2 are kept. As a result, the vector register 12-2 has the vector data X'(b1, b2, x3, b4, x5, b6, b7, x8, x9, b10) after the masked list vector load instruction.

For processing of a list vector store instruction, the store data elements in the store data storage means 20 corresponding to the positions for which the mask data in the mask registration means 18 is "1" are sent to the main storage 17 together with the addresses corresponding to such elements in the address information registration means 19. Thus, the store data are stored at the main storage 17 while avoiding data replacement for the positions where the mask data is "0" in the main storage 17.

Referring now to the data flow in FIG. 4, the operation for a masked list vector store instruction at the vector processing device according to the second embodiment is described. Suppose here that the vector register 12-1 keeps the address data A (a1, a2, a3 . . . . a10) for access to the main storage 17, the vector register 12-2 keeps B (b1, b2, b3 . . . , b10) to be stored to the main storage 17 and the vector control register 13 keeps the mask data (1, 1, 0, 1, 0, 1, 1, 0, 0, 1).

When a masked list vector store instruction is issued, the vector processor 10 sends the address data, store data and mask data to the main storage controller 16. The mask data (1, 1, 0, 1, 0, 1, 1, 0, 0, 1) are stored at the mask registration means 18, the address data (a1, a2, a3, . . . . a10) are stored to the address information registration means 19 and the data (b1, b2, b3, . . . b10) are stored at the store data storage means 20. The memory access control means 22 sends the address and store data for the positions where the mask data is "1" in the mask registration means 18, i.e. (a1, a2, a4, a6, a7, a10) and (b1, b2, b4, b6, b7 and b10), to the main storage 17. The main storage 17 stores the store data (b1, b2, b4, b6, b7, b10) to the positions specified by the addresses (a1, a2, a4, a6, a7, a10).

Figure 5:
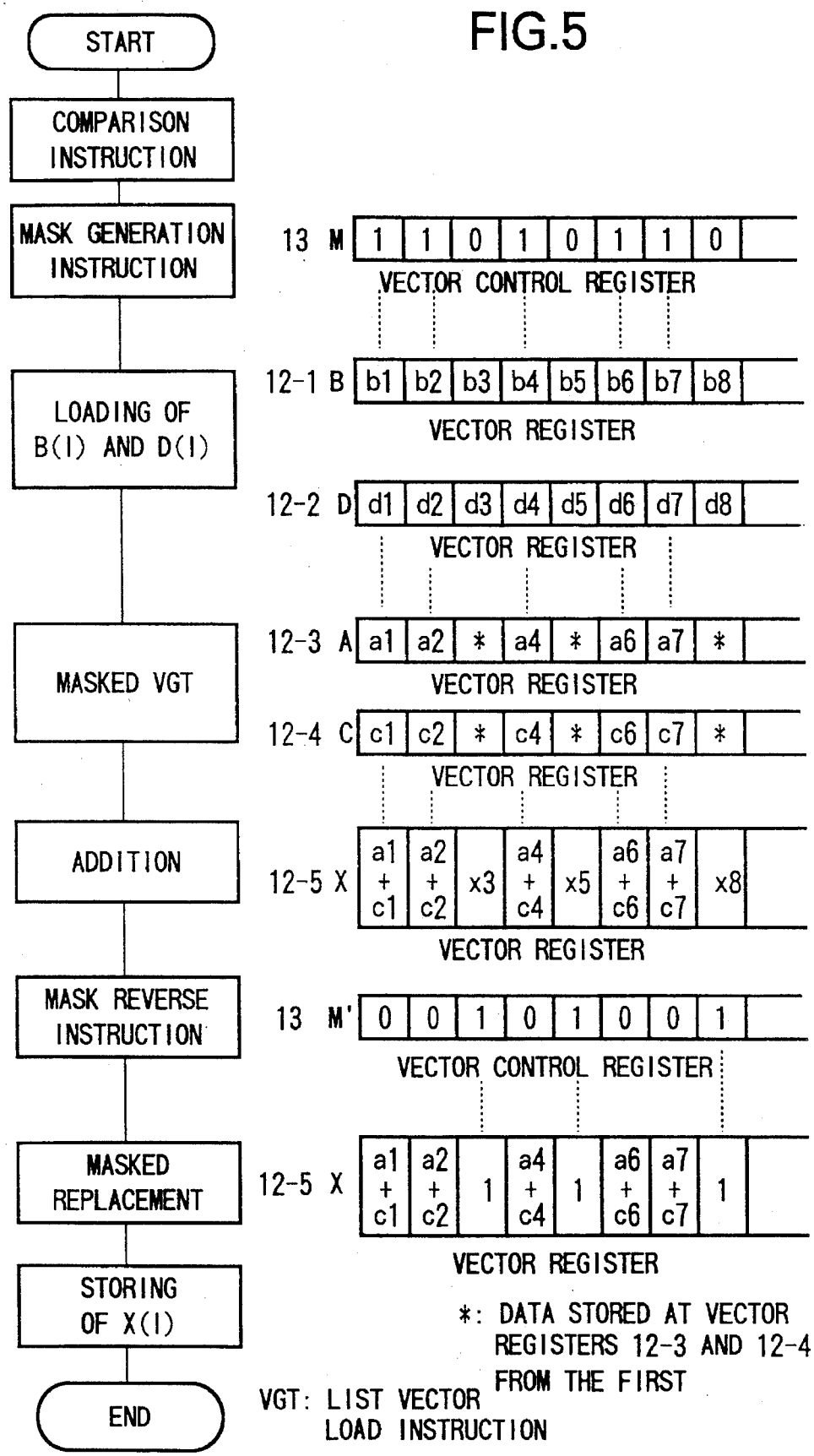
FIG. 5 is a flowchart to illustrate the processing of an IF statement including list vector loading by a vector processing device of the present invention.

Referring to the flowchart and the register contents shown in FIG. 5, the vector processing device is now supposed to process, for example, the conditional expression (IF statement) as follows:

DO 10 I= 1, N

IF (M(I). EQ. O)

THEN

X(I)= A(B(I))+ C(D(I))

ELSE

X(I)= 1

10 CONTINUE

Firstly, a comparison instruction causes comparison of M(I) and O. A subsequent mask generation instruction stores the mask data to the vector control register 13. Suppose here that the mask data are (1, 1, 0, 1, 0, 1, 1, 0, . . . ). Then, the data B(I) and D(I) are loaded from the main storage 17 to the vector registers 12-1 and 12-2.

Next, a masked list vector load instruction causes the data in the vector registers 12-1 and 12-2 to be read out and sent to the main storage controller 16, and at the same time causes the mask data in the vector control register 13 to be sent to the main storage controller 16. The main storage controller 16 follows the method as described above to load the data A(B(I))(a1, a2, *, a4, *, a6, a7 ... ) and C(D(I))(c1, c2, *, c4, *, c6, c7, ... ) to the elements where the condition of the IF statement is true (first, second, fourth, sixth, seventh ... elements) and stores them to the vector registers 12-3 and 12-4. Then, the data in the vector registers 12-3 and 12-4 are read out and input to the adder 14-1 for processing, and the results are stored to the vector register 12-5. The vector register 12-5 is supposed to keep the vector data X(X1, X2, X3, X4, X5, X6, X7, ... ) as the initial values.

Next, a mask reverse instruction reverses the bits in the vector control register 13 to obtain the data M'(0, 0, 1, 0, 1, 0, 0, 1). The elements in the vector register 12-5 for which the mask data is "1" (third, fifth, eighth .... elements) are replaced with the immediate value "1". Then, the contents of the vector register 12-5 are stored to the main storage 17.

The IF statement processing as described above with the vector processing device according to the first or second embodiment reduces the number of accesses to the main storage 17, and at the same time, shortens the data storing time for the vector registers. Further, such procedure using a masked list vector loading eliminates the need of conventional auxiliary operations, which improves the speed of processing.

Figure 6:
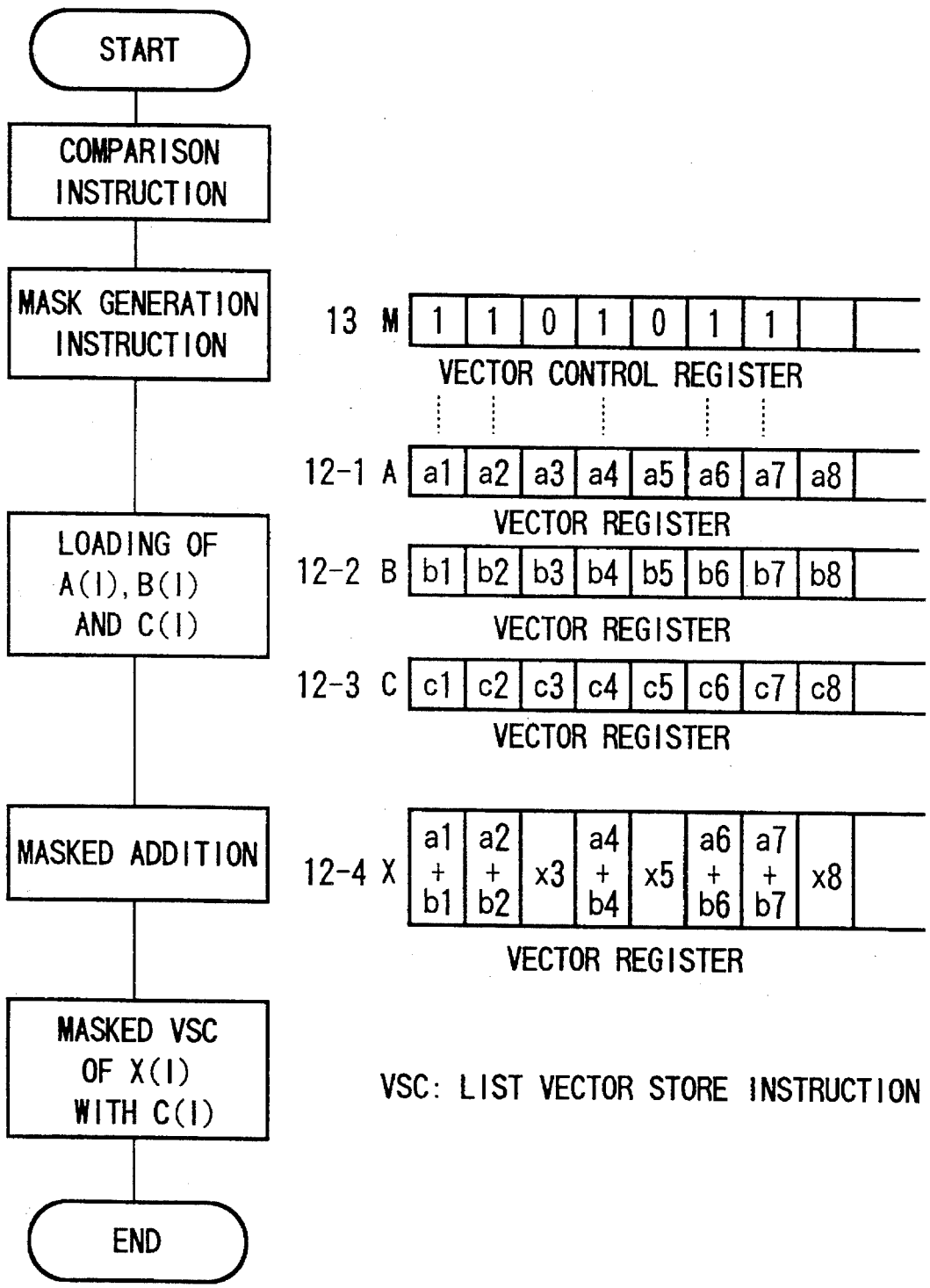
FIG. 6 is a flowchart to illustrate the processing of an IF statement including list vector storing by a vector processing device of the present invention.
Figure 9:
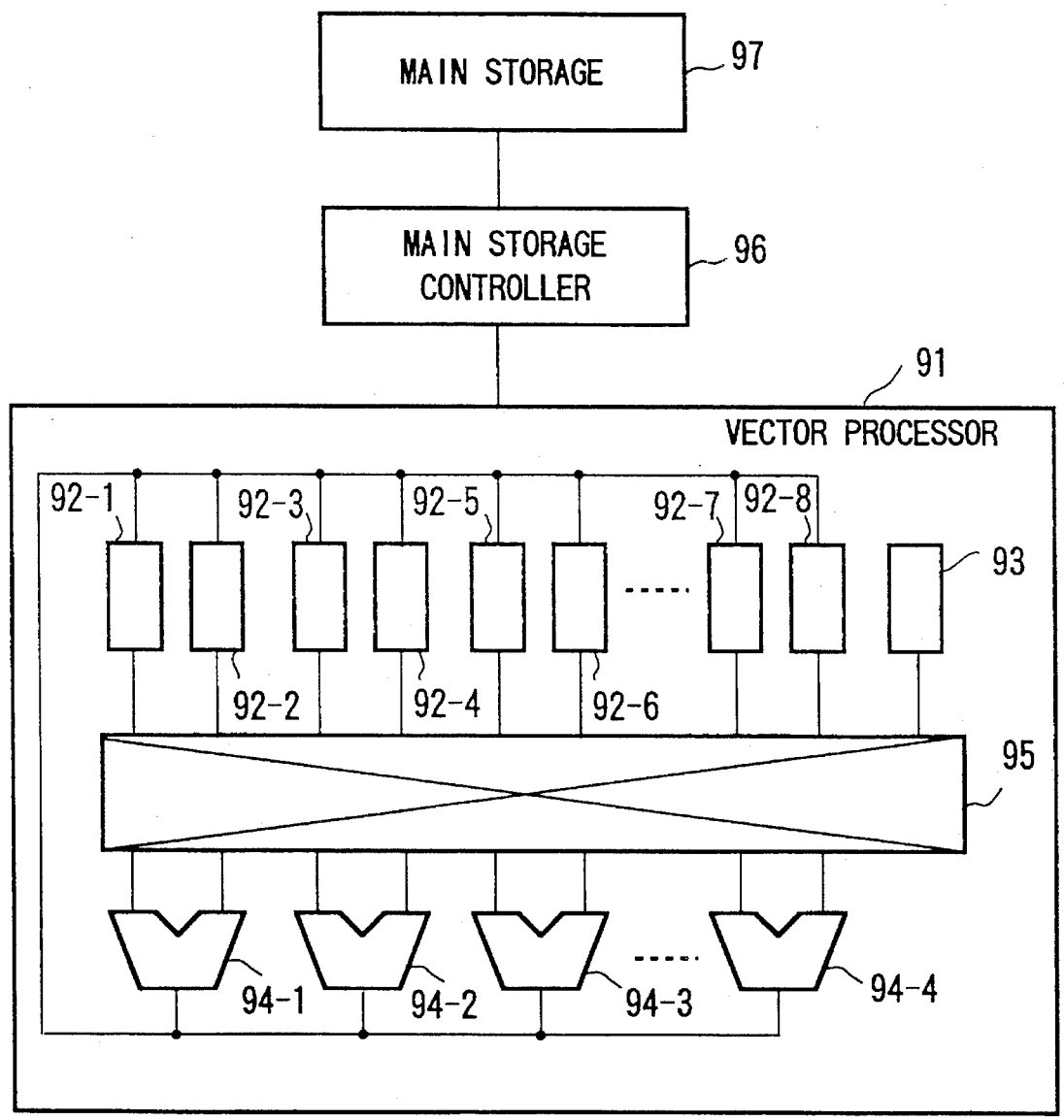
FIG. 9 is a configuration example of a conventional vector processing device.
Figure 12:
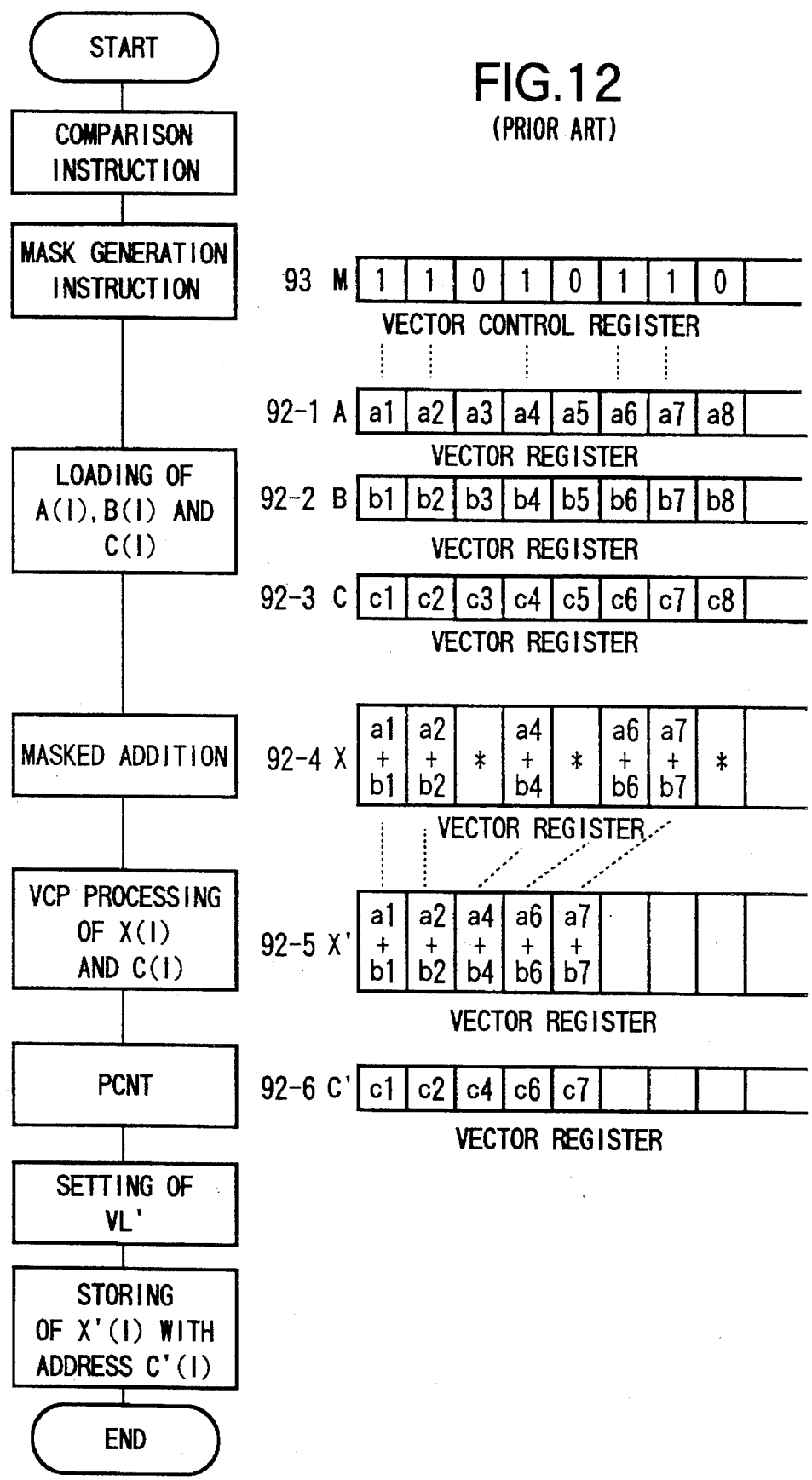
FIG. 12 is a flowchart to illustrate a third conventional method of processing an IF statement including list vector storing.

Referring to the flowchart and the register contents in FIG. 6, another example of processing is described with supposing an IF statement as follows:

DO 10 I= 1, N

IF (M(I). EQ. O) GO TO 10

X(C(I))= A(I)+B(I)

10 CONTINUE

Firstly, a comparison instruction causes comparison of M(I) and O. A subsequent mask generation instruction stores the mask data to the vector control register 13. Suppose here that the mask data are (1, 1, 0, 1, 0, 1, 1, 0, ... ). Then, the data A(I), B(I) and C(I) are loaded from the main storage 17 to the vector registers 12-1, 12-2 and 12-3.

Next, the data in the vector registers 12-1 and 12-2 are read out and input to the adder 14-1 for processing. The operation results are stored to the vector register 12-4, only for the elements at the positions where the mask data in the vector control register 13 is "1" (first, second, fourth, sixth, seventh .... elements). For the elements at the positions where the mask data is "0" (third, fifth, eighth .... elements), the initial data of the vector register 12-4 are left. The resulting data are (a1+b1, a2+b2, *, a4+b4, *, a6+b6, a7+b7, *, .... ). The vector register 12-5 is supposed to keep the vector data X(X1, X2, X3, X4, X5, X6, X7, ... ) as the initial data.

Next, a masked list vector store instruction reads out the address data and the store data from the vector registers 12-3 and 12-4 respectively and sends them to the main storage controller 16. The main storage controller 16, upon receipt of the address data and the store data, stores the store data at the main storage 17 only for the elements for which the condition in the IF statement is true (first, second, fourth, sixth, seventh ... elements).

With the vector processing device according to the first and the second embodiments, IF statements can be processed with a reduced number of accesses to the main storage 17 and in a shorter time for data storing at the vector registers. Besides, masked list vector storing eliminates the need of conventional auxiliary operations, which improves the operation speed.

Thus, a masked list vector loading instruction during list vector loading for an IF statement eliminates the need of auxiliary operations. Since the load data can be obtained by access to the main storage only when the condition of the IF statement is true, such method further reduces the number of accesses to the main storage, which improves the speed of conditional list vector loading. In list vector storing for an IF statement, a masked vector store instruction eliminates the need of auxiliary operations. Besides, since the subject data are stored with access to the main storage only when the condition of the IF statement is true, the number of accesses to the main storage is reduced, which improves the speed of storing. This also eliminates the need of a compiler which changes the method of processing according to information including the rate of "true" for the applicable IF statement.

Obviously, various modifications can be made to the above embodiments. It is intended to cover in the appended claims all such modifications and variations as fall within the true spirit and scope of the present invention.

What is claimed is:

1. A vector processing device comprising:

a vector processing portion including at least one vector register, and a vector control register to store mask information indicating valid bits of vector data, which are to be processed by said vector processing device;

a storage; and a storage controller to control access to said storage, said storage controller including address information registration means for storing address data corresponding to locations in said storage which are to be accessed, mask registration means for holding contents of said vector control register, load data storage means for temporarily storing load data obtained from said storage, store data storage means for temporarily storing store data to be stored in said storage, and store direction means for generating a signal that indicates locations of said storage which are to be accessed, said signal being generated in accordance with said mask information and said address data, such that said signal contains addresses among said address data which correspond to said valid bits of said mask information, and for storing in said storage said store data which correspond to said addresses contained in said signal, and data storage means for storing portions of said load data which correspond to said valid bits of said mask information in said at least one vector register.

2. A vector processing device comprising:

a vector processing portion having at least one vector register, and a vector control register to store mask information indicating valid bits of vector data which are to be processed by said vector processing device;

a storage; and a storage controller to control access to said storage, said storage controller having address data selection means for generating a selected address signal which indicates selected locations in said storage which are to be accessed, said address data selection means including access information registration means having an address information registration means for storing address data corresponding to locations in said storage which are to be accessed, mask registration means for keeping the mask information received from said vector control register, and access control means which selects addresses among said address data which correspond to said valid bits of said mask information to generate said selected address signal, and data storage means for storing load data obtained from said storage using said selected address signal to said at least one vector register, said data storage means further including load data storage means for temporarily storing said load data, and load data expansion means which expands said load data temporarily held in accordance with said mask information and stores them in said at least one vector register.

3. A vector processing device of claim 2, wherein said access information registration means further includes store data storage means which temporarily keeps store data to be stored in said storage, and wherein said access control means obtains portions of the store data which correspond to valid bits of said mask information and also obtains a storing address of said storage from said access information registration means.

4. A vector processing device of claim 3, wherein said access control means accesses said storage at addresses among said address data for which a corresponding mask information bit is valid.

5. A vector processing device of claim 3, wherein said load expansion means stores said load data for elements of said at least one vector register for which a corresponding mask information bit is valid and stores an arbitrary value for elements of said at least one vector register for which a corresponding mask information is invalid.

* * * * *